(12) United States Patent
Zhang et al.

(10) Patent No.: US 11,742,917 B2
(45) Date of Patent: Aug. 29, 2023

(54) ENCODING OF ENHANCED TYPE II CHANNEL STATE INFORMATION

(71) Applicant: Apple Inc., Cupertino, CA (US)

(72) Inventors: Yu Zhang, Beijing (CN); Wei Zeng, San Diego, CA (US); Haitong Sun, Irvine, CA (US); Yuchul Kim, Santa Clara, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/344,588

(22) Filed: Jun. 10, 2021

(65) Prior Publication Data

US 2021/0306046 A1    Sep. 30, 2021

Related U.S. Application Data

(63) Continuation of application No. 16/735,586, filed on Jan. 6, 2020, now Pat. No. 11,063,649.

(30) Foreign Application Priority Data

Jan. 9, 2019    (CN) .......................... 201910018322.1

(51) Int. Cl.
*H04B 7/06* (2006.01)
*H04W 24/10* (2009.01)
(Continued)

(52) U.S. Cl.
CPC ......... *H04B 7/0626* (2013.01); *H04B 7/0486* (2013.01); *H04B 7/0632* (2013.01);
(Continued)

(58) Field of Classification Search
CPC .... H04B 17/24; H04B 17/309; H04B 7/0486; H04B 7/0626; H04B 7/0632;
(Continued)

(56) References Cited

U.S. PATENT DOCUMENTS 8,885,453 B2    11/2014   Stager
10,009,088 B2    6/2018   Rahman
(Continued)

FOREIGN PATENT DOCUMENTS

CN    104205684 A    12/2014
CN    106537809 A    3/2017
(Continued)

OTHER PUBLICATIONS

Office Action for Chinese Patent Application No. 201910018322.1, dated Sep. 26, 2021.
(Continued)

*Primary Examiner* — Nader Bolourchi
(74) *Attorney, Agent, or Firm* — Kowert, Hood, Munyon, Rankin & Goetzel, P.C.; Jeffrey C. Hood

(57) ABSTRACT

Apparatuses, systems, and methods for a wireless device to encode channel state information (CSI), e.g., enhanced type II CSI. A common frequency basis may be selected. Spatial-frequency coefficients, frequency basis related information, and/or spatial basis related information may be determined. At least a portion of the coefficients and/or information may be encoded in a CSI report.

20 Claims, 15 Drawing Sheets

(51) Int. Cl.
- *H04W 24/08* (2009.01)
- *H04L 5/00* (2006.01)
- *H04B 7/0456* (2017.01)
- *H04L 1/06* (2006.01)
- *H04W 72/54* (2023.01)

(52) U.S. Cl.
CPC .......... *H04L 1/0693* (2013.01); *H04L 5/0057* (2013.01); *H04W 24/08* (2013.01); *H04W 24/10* (2013.01); *H04W 72/54* (2023.01)

(58) Field of Classification Search
CPC ... H04B 7/0639; H04L 1/0693; H04L 5/0057; H04W 24/08; H04W 24/10; H04W 72/1226; Y02D 30/70
See application file for complete search history.

(56) References Cited

U.S. PATENT DOCUMENTS

| | | | |
|---|---|---|---|
| 10,027,391 | B2 | 7/2018 | Janis |
| 10,382,230 | B2 | 8/2019 | Wang |
| 2019/0036569 | A1 | 1/2019 | Deng |
| 2019/0081678 | A1 | 3/2019 | Park |
| 2019/0334587 | A1 | 10/2019 | Rahman |
| 2022/0200666 | A1* | 6/2022 | Lee .................. H04B 7/0626 |
| 2022/0239357 | A1* | 7/2022 | Chung ............... H04B 7/0626 |

FOREIGN PATENT DOCUMENTS

| | | |
|---|---|---|
| CN | 107231825 A | 10/2017 |
| WO | 2017184865 A1 | 10/2017 |

OTHER PUBLICATIONS

Office Action for Chinese Patent Application No. xxx, dated Sep. 26, 2021.

Ericsson "Sumary on views on CSI reporting for Type I and Type II"; 3GPP TSG-RAN WG1 #90 R1-1715181; Prague, Czechia; Aug. 12-15, 2017; 9 pages.

Ericsson "WF on defining frequency-granularities for CSI reporting and CSI-RS"; 3GPP TSG RAN WG1 Meeting #90 R1-1715045; Prague, Czech Republic; Aug. 21-25, 2017; 4 pages.

Huawei et al. "Independent and joint control of CSI-RS transmission and CSI reporting for NR MIMO"; 3GPP TSG RAN WG1 #88 Meeting R1-1701681; Athens, Greece; Feb. 13-17, 2017; 7 pages.

Ahmed, R., et al., "Overhead Reduction of NR type II CSI for NR Release 16", WSA 2019; 23rd International ITG Workshop on Smart Antennas, Vienna, Austria, 2019, pp. 1-5.

Ahmed, R., et al., "Comparison of Explicit CSI Feedback Schemes for 5G New Radio," 2019 IEEE 89th Vehicular Technology Conference (VTC2019-Spring), Kuala Lumpur, Malaysia, 2019, pp. 1-5.

"RP-181453 WI Proposal on NR MIMO Enhancements, 3GPP TSG RAN Meeting 80," Samsung, 2018.

"R1-1906286 Enhancements on overhead reduction and rank extension for type II CSI feedback, 3GPP TSG RAN WG1 97," OPPO, 2019.

"RI-1904780 Discussion on Type II CSI overhead reduction, 3GPP TSG RAN WG1 Meeting #96bis," Spreadtrum Communications, 2019.

"RI-1713916 Feedback Design for CSI Type II, 3GPP TSG RAN WG1 Meeting #90," NTT DOCOMO, 2017.

"RI-1720306, CSI Feedback Overhead Reduction, 3GPP TSG RAN WG1 Meeting 90bis," Samsung, 2017.

* cited by examiner $$\underbrace{(w^\ell(1) \cdots w^\ell(n_3) \cdots w^\ell(N_3))}_{906} = \underbrace{\begin{pmatrix} v_0 & \cdots & v_{L-1} \end{pmatrix}}_{} \underbrace{\begin{pmatrix} p_{0,\ell}^{(1)} \\ \vdots \\ p_{2L-1,\ell}^{(1)} \end{pmatrix}}_{1220} \underbrace{\begin{pmatrix} p_{0,1,\ell}^{(2)} e^{j\phi_{0,1,\ell}} & \cdots & p_{0,M,\ell}^{(2)} e^{j\phi_{0,M,\ell}} \\ \vdots & \ddots & \vdots \\ p_{2L-1,1,\ell}^{(2)} e^{j\phi_{2L-1,1,\ell}} & \cdots & p_{2L-1,M,\ell}^{(2)} e^{j\phi_{2L-1,M,\ell}} \end{pmatrix}}_{1630} \underbrace{\begin{pmatrix} p_{1,\ell}^{(3)} \\ \vdots \\ p_{M,\ell}^{(3)} \end{pmatrix}}_{1632} \underbrace{\begin{pmatrix} w_{f,1}^H \\ \vdots \\ w_{f,M}^H \end{pmatrix}}_{1616}$$

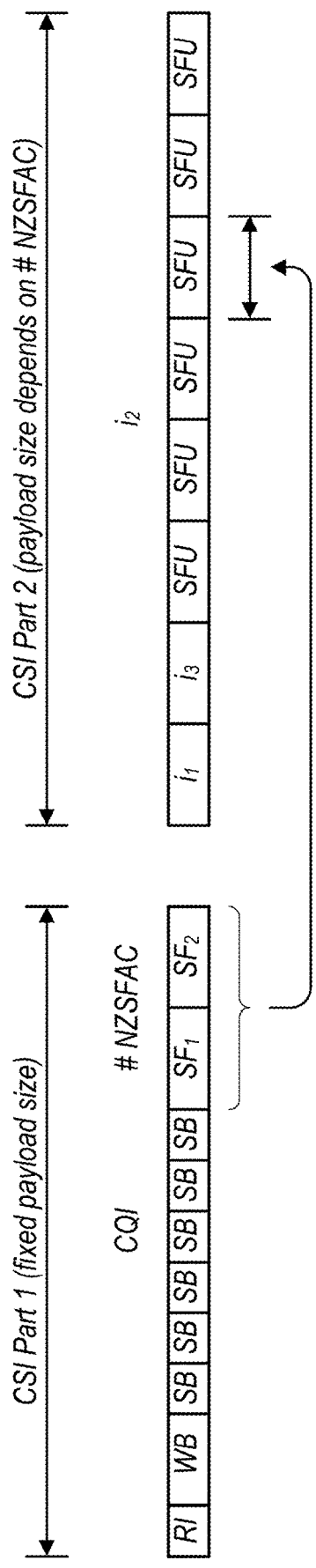

FIG. 17

$$(w^\ell(1) \ \cdots \ w^\ell(n_3) \ \cdots \ w^\ell(N_3)) = \underbrace{(v_0 \ \cdots \ v_{L-1} \ v_0 \ \cdots v_{L-1})}_{906 \ \uparrow \ i_1} \underbrace{\begin{pmatrix} p^{(2)}_{0,1,\ell}\phi_{0,1,\ell} & \cdots & p^{(2)}_{0,M,\ell}\phi_{0,M,\ell} \\ \vdots & \ddots & \vdots \\ p^{(2)}_{2L-1,1,\ell}\phi_{2L-1,1,\ell} & \cdots & p^{(2)}_{2L-1,M,\ell}\phi_{2L-1,M,\ell} \end{pmatrix}}_{1830 \ \uparrow \ i_2} \underbrace{\begin{pmatrix} w^H_{f,1} \\ \vdots \\ w^H_{f,M} \end{pmatrix}}_{1816 \ \uparrow \ i_3}$$

ENCODING OF ENHANCED TYPE II CHANNEL STATE INFORMATION

PRIORITY INFORMATION

This application is a continuation of U.S. patent application Ser. No. 16/735,586, entitled "Encoding of Enhanced Type II Channel State Information" filed Jan. 6, 2020, which claims benefit of priority to Chinese Application No. 201910018322.1, titled "Encoding of Enhanced Type II Channel State Information", filed Jan. 9, 2019, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to apparatus, systems, and methods for a wireless device to perform encode channel state information.

DESCRIPTION OF THE RELATED ART

Wireless communication systems are rapidly growing in usage. Further, wireless communication technology has evolved from voice-only communications to also include the transmission of data, such as Internet and multimedia content. Enhanced channel state information (CSI) is important to support features such as beam forming and multiple-in-multiple out (MIMO). However, such enhanced CSI may increase signaling overhead. Thus, improvements in the field are desired.

SUMMARY

Embodiments relate to apparatuses, systems, and methods to perform encoding of channel state information (CSI), e.g., enhanced type II CSI. Embodiments may reduce the signaling overhead associated with CSI reporting. In some embodiments, common frequency basis selection may be applied. Moreover, a number of coefficients may be selected to further reduce signaling overhead.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 16 and 17 illustrate a common frequency basis selection for encoding PMI, according to some embodiments; and FIGS. 18 and 19 illustrate a variation on the common frequency selection including selecting coefficients, according to some embodiments.

Figure 1:
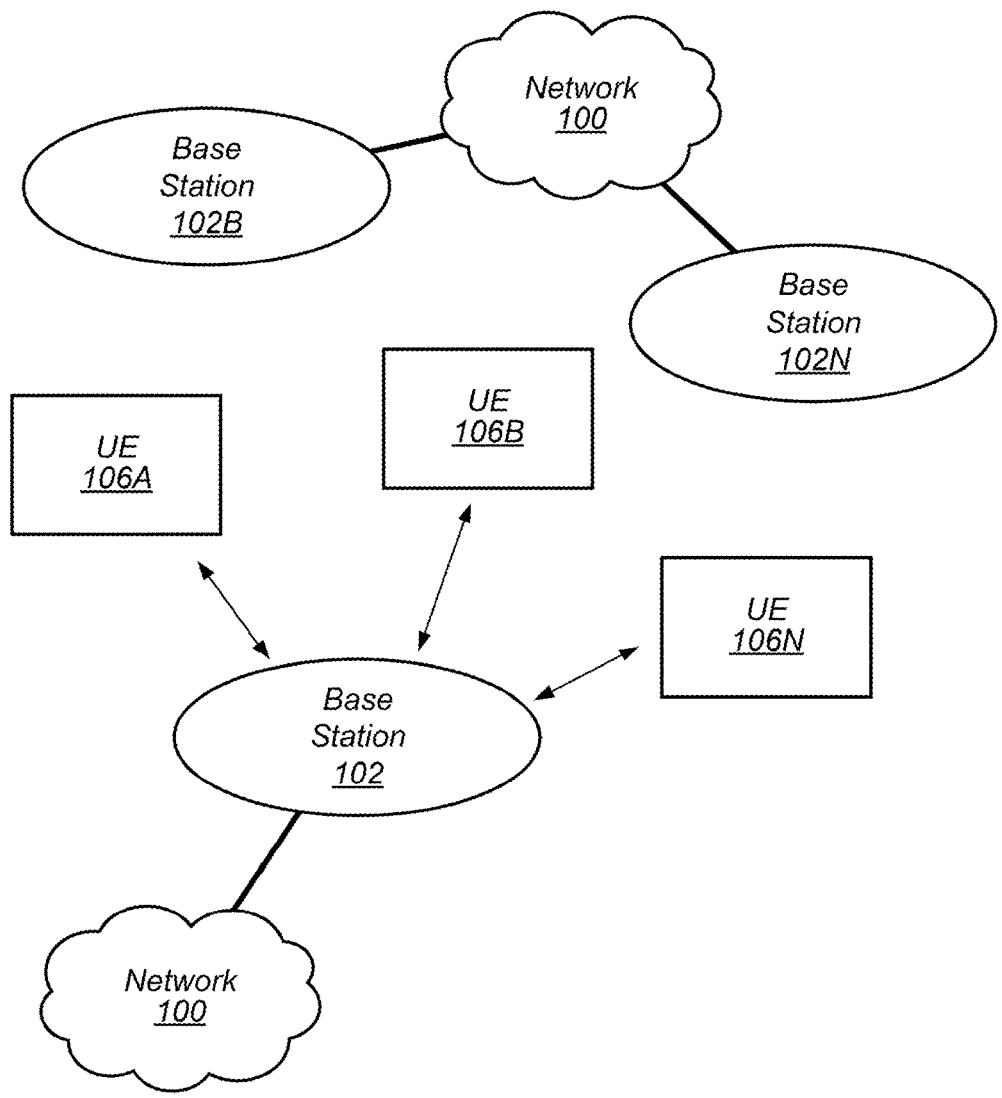
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
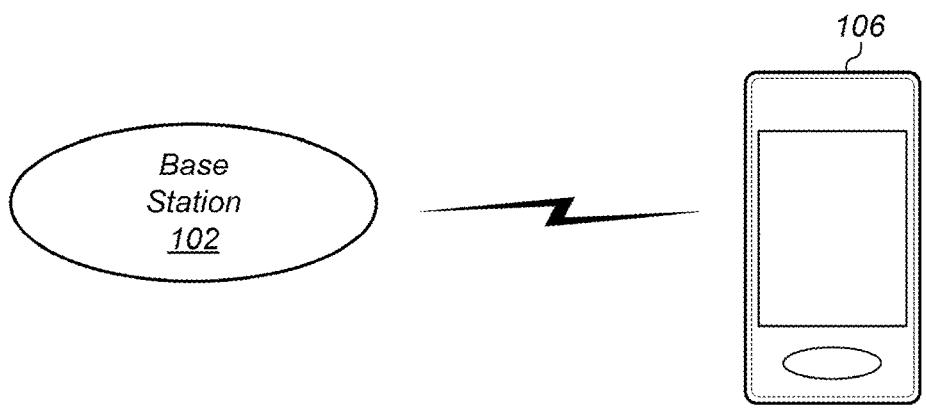
FIG. 2 illustrates a base station (BS) in communication with a user equipment (UE) device, according to some embodiments.

Acronyms
  CSI: channel state information
  PMI: precoding matrix indicator
  RI: rank indicator
  CQI: channel quality indicator
  UCI: uplink control information
  RS: reference signal
  DFT: discrete Fourier transform
  WB: wideband
  SB: subband
  NZWAC: non-zero wideband amplitude coefficients
  NZSFAC: non-zero spatial/frequency amplitude coefficient
  SFU: spatial-frequency unit FIGS. 1 and 2—Communication System FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
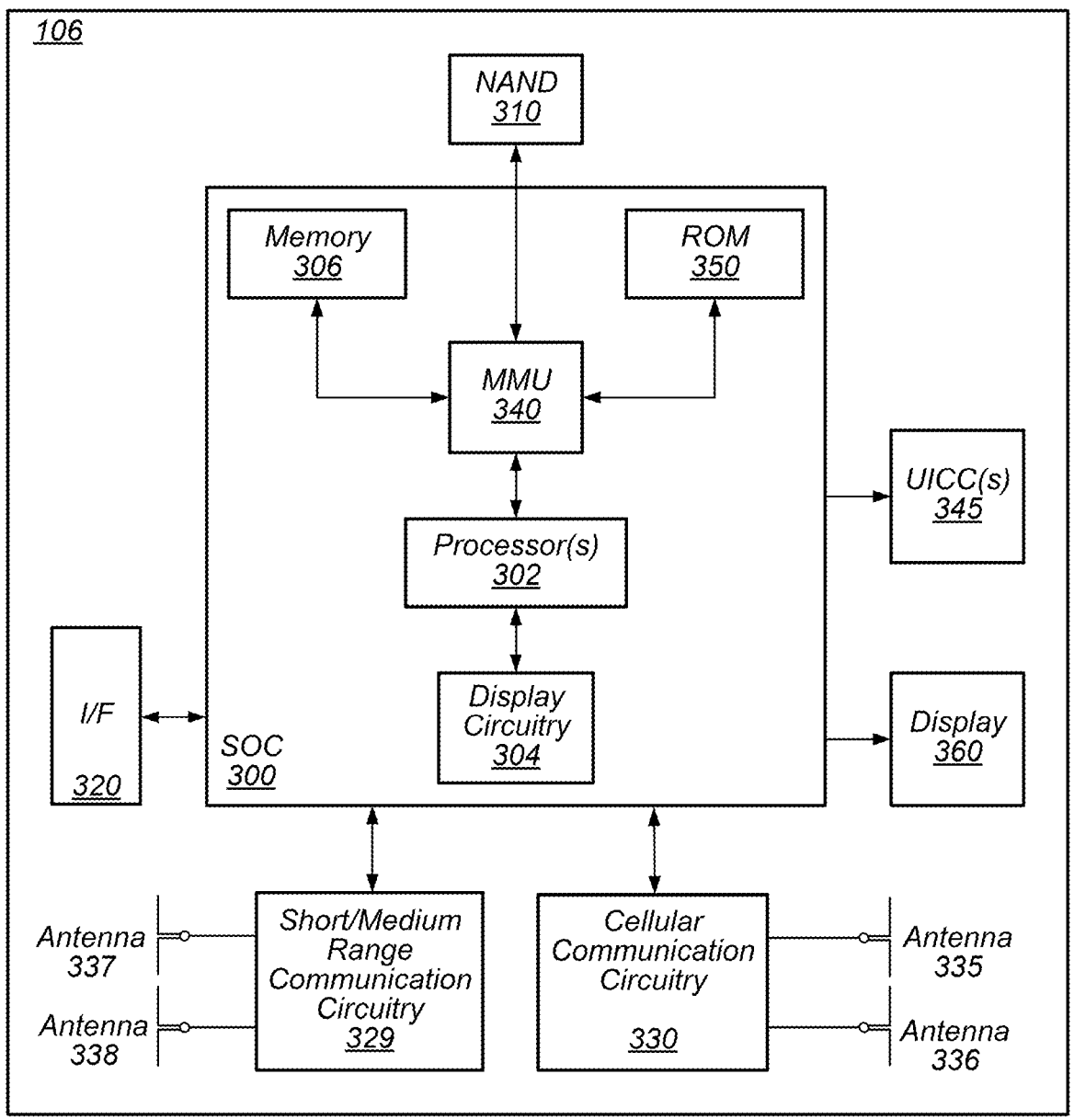
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using RRC multiplexing to perform transmissions according to multiple radio access technologies in the same frequency carrier, as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
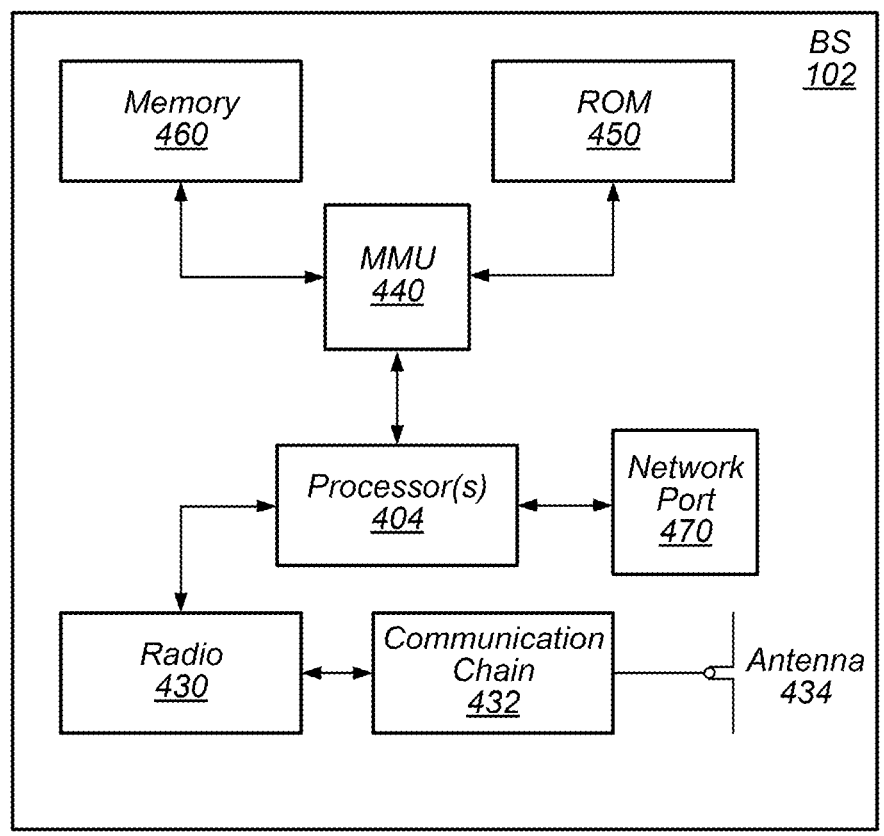
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
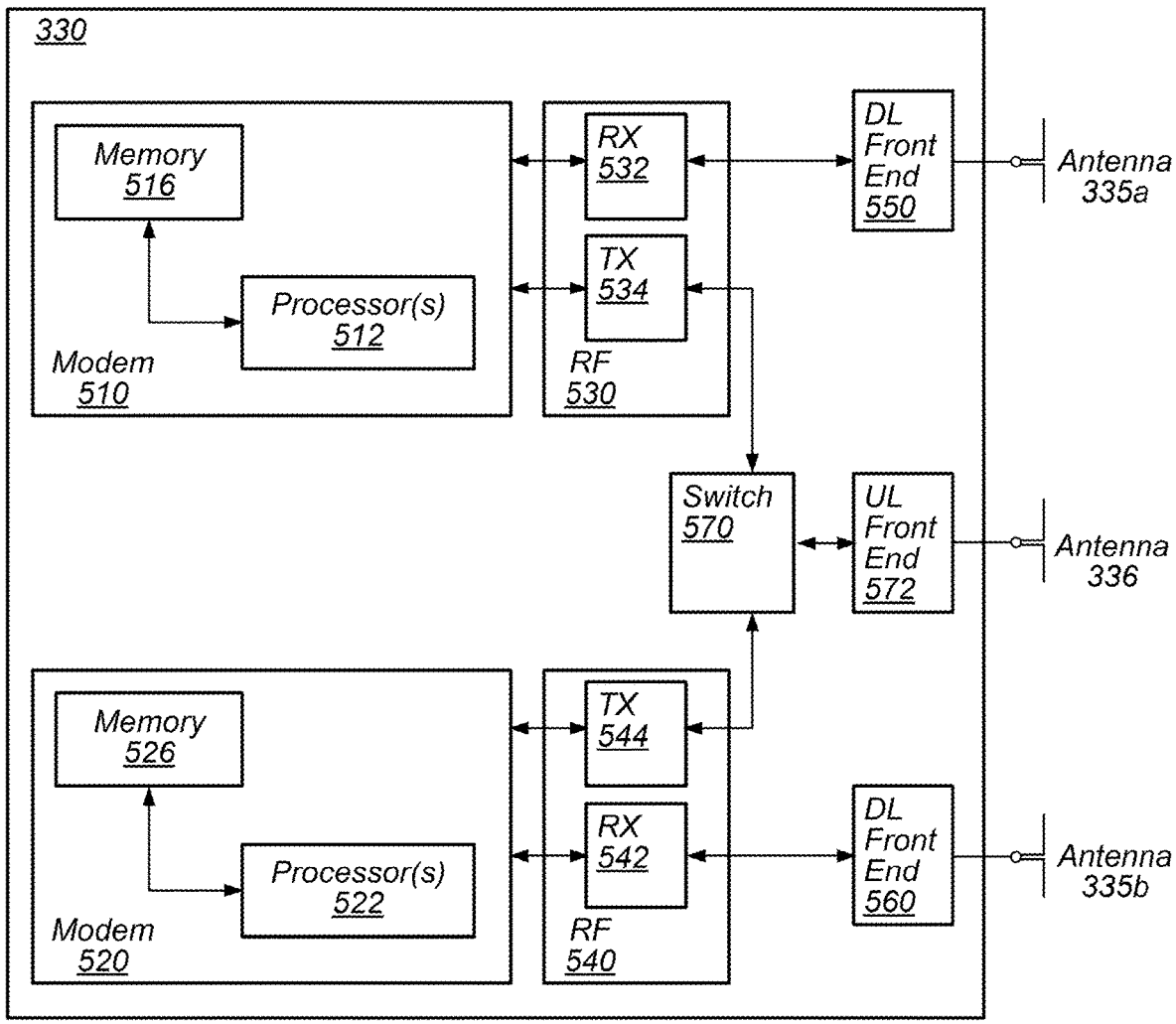
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using RRC multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing features for using RRC multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
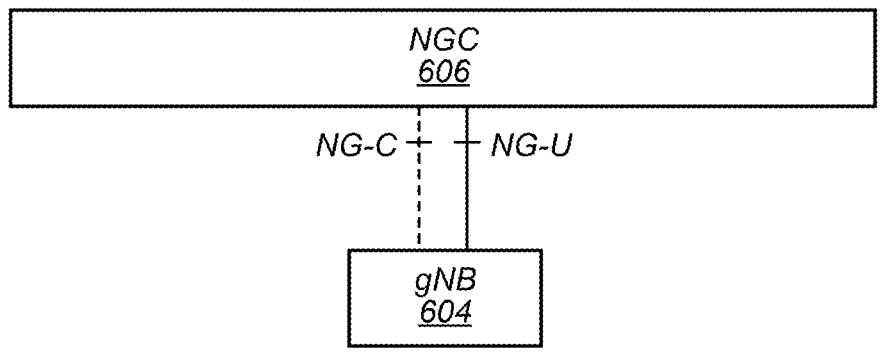
FIGS. 6 and 7 illustrate examples of a 5G NR base station (gNB), according to some embodiments.
Figure 7:
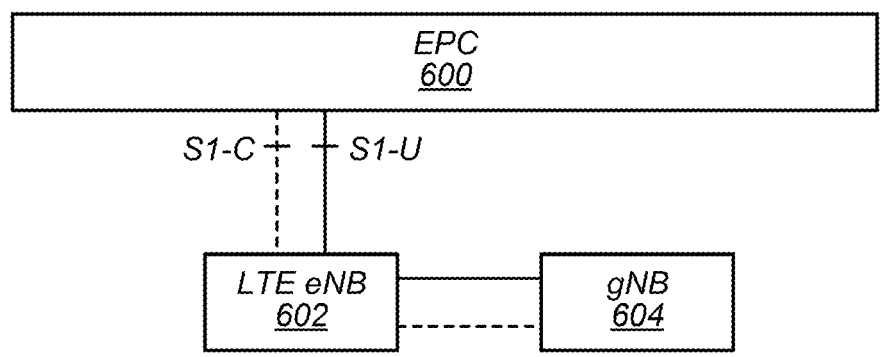

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
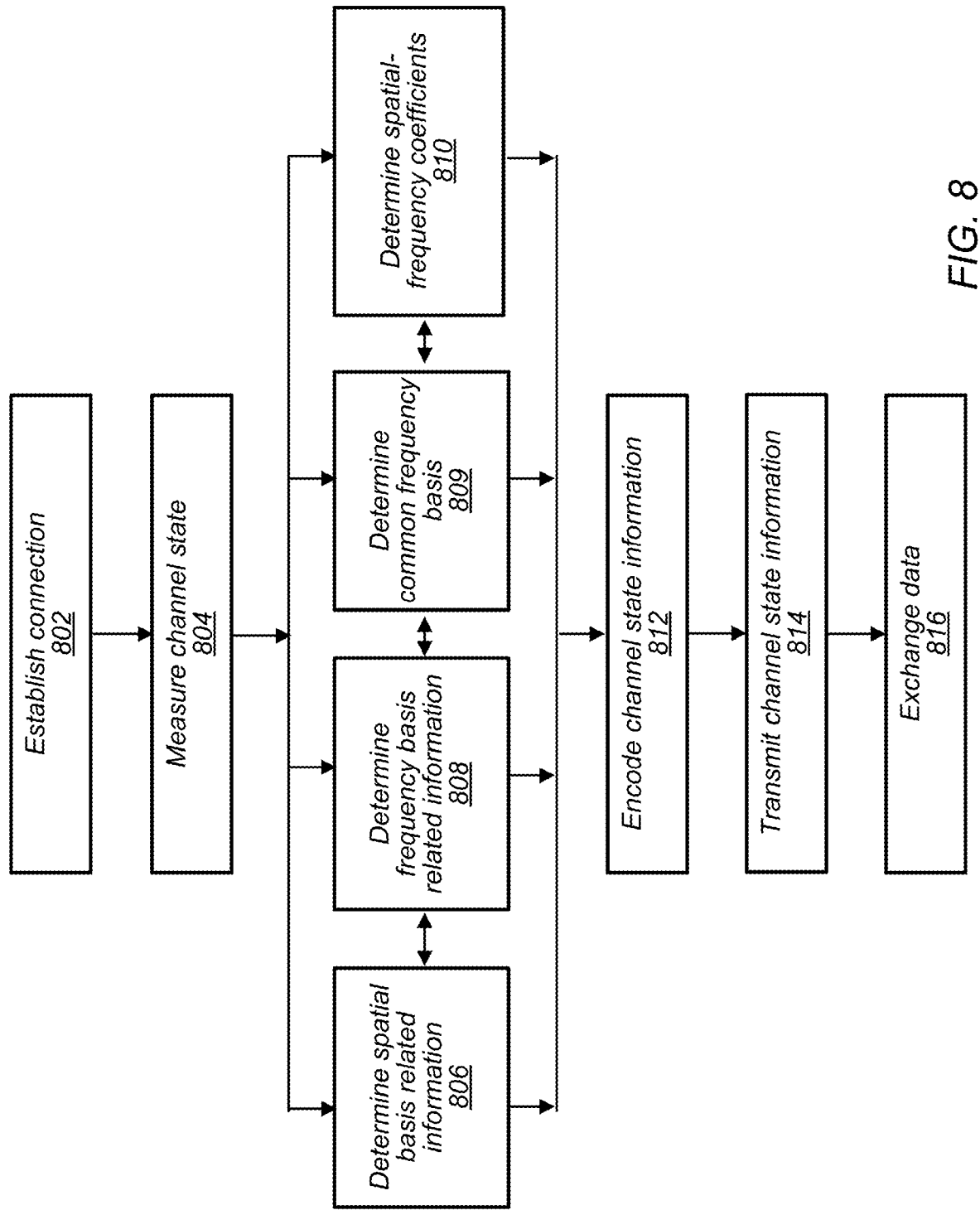
FIG. 8 illustrates techniques for encoding CSI using common frequency basis selection, according to some embodiments.

FIG. 8—CSI Encoding with Reduced Overhead

As noted above, a UE 106 and BS 102 may each include any number of antennas/ports and may be configured to use the antennas to transmit and/or receive directional wireless signals (e.g., beams). To receive and/or transmit such directional signals, the antennas of the UE 106 and/or BS 102 may be configured to apply different "weights" to different antennas. The process of applying these different weights may be referred to as "precoding".

Channel state information (CSI) may refer to the properties of a wireless channel, e.g., between a UE 106 and BS 102. CSI may be estimated (e.g., in the downlink direction) by the UE 106 and reported back to the BS 102. CSI may be reported, at least in part via a precoding matrix indicator (PMI). The BS 102 may then use the CSI (e.g., potentially multiple PMIs) for precoding.

NR release 15 includes Type I and Type II CSI. Type II CSI may include both wideband (WB) and subband (SB)-specific information, e.g., for each layer and for each polarization. With Type II CSI, the precoding weights for a layer may be represented by a linear combination of a set of DFT vectors. The linear combination coefficients in a Type II CSI may be element-wise quantized for each subband and for each polarization. Thus, Type II CSI may require large amounts of signaling overhead, e.g., to enumerate a potentially large number of SB-specific combination coefficients in the precoding vector.

For each layer, the precoding vector may be a linear combination of a number (L) of discrete Fourier transform (DFT) vectors. The length of each DFT vector may correspond to the size of the array of antennas (e.g., an array of $N_1$ by $N_2$ antennas may imply DFT vectors of length $N_1 N_2$ (e.g., $N_1*N_2$)). The DFT vectors may be common for all SBs. For example, the (L) DFT vectors may be block diagonal matrix which may be multiplied by a column of SB-specific combination coefficients.

WB PMI may encode various information, including rotation in each spatial dimension, indices of the (L) spatial basis, a strongest coefficient for each layer, and a WB amplitude for each layer. SB PMI may include SB phase and (e.g., if configured) SB amplitude. The number of non-zero wideband amplitude coefficients (NZWAC) may determine the number of bits of PMI for each SB.

Frequency compression may be applied to reduce overhead. For example, if the channel is less frequency-selective, neighboring coefficients may exhibit similarity (e.g., SB-specific coefficients may be correlated). Therefore, overhead may be reduced by compression in the frequency dimension, e.g., by compressing coefficients of a number ($N_3$) of SBs to a smaller number (M) of frequency basis ("taps").

An aggregation of precoding vectors may be expressed as a matrix. The matrix may be equal to a product of a matrix of the L DFT vectors (e.g., the spatial basis or "beams") multiplied by a block diagonal matrix of the compressed combination coefficients multiplied by the M frequency basis.

Notwithstanding the above techniques, the size of a (e.g., Type II) CSI report may be quite large. For example, due to the number of antennas/beams and SBs, the number of SB-specific coefficients may be large (e.g., even after frequency compression). Accordingly, further techniques for reducing CSI overhead may be desired.

FIG. 8 illustrates exemplary techniques for reducing overhead in CSI encoding, e.g., relative to techniques employed in NR release 15. Embodiments described herein may encode dynamically selected PMI components in order to report an aggregated precoding vector for each layer. Various ones of the described embodiments may further include means for packing PMI components (and other CSI components, e.g., rank indicator (RI), channel quality indicator (CQI), etc.) to facilitate decoding of uplink control information (UCI) at the base station. Aspects of the method of FIG. 8 may be implemented by a wireless device, such as the UEs 106, in communication with one or more base station (e.g., BS 102) as illustrated in and described with respect to the Figures, or more generally in conjunction with any of the computer systems or devices shown in the Figures, among other devices, as desired. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. Similarly, although some elements of the method are described in a manner relating to the measurement and reporting of a downlink channel (e.g., by a UE reporting to a base station), the method may also be applied in the reverse (e.g., a base station measuring an uplink channel). Further, the method may be applied in other contexts (e.g., between multiple UEs, e.g., in device-to-device communications). In various embodiments, some of the elements of the methods shown may be performed concurrently, in a different order than shown, may be substituted for by other method elements, or may be omitted. Additional method elements may also be performed as desired. As shown, the method may operate as follows.

A wireless device (e.g., UE 106) may establish communication with a base station (e.g., BS 102) (802), according to some embodiments. The UE 106 and BS 102 may communicate according to one or more wireless standards (e.g., NR, among various possibilities) and may exchange application data and/or control information in the uplink and/or downlink directions. The communication may use any number of bands and/or SBs, e.g., including licensed and/or unlicensed frequencies. The communication may use any number of antennas/ports at the UE 106 and/or BS 102. The UE 106 and/or BS 102 may use beamforming techniques and may weight the various antennas differently, e.g., to transmit and/or receive any number of beams.

The BS 102 may provide control information to the UE, according to some embodiments. The control information may specify configuration parameters for measuring and reporting channel state information (CSI). For example, the configuration parameters may include timing of measurements and/or reports, frequencies (e.g., bands and/or SBs) to measure and/or report, beams to measure and/or report, numbers of coefficients to include in a CSI report (e.g., per beam (M) or in total ($K_0$)), guidelines for dynamically selecting specific coefficients to report, etc. Note that the number of coefficients to report may be smaller than the number of beams times the number of SBs, indicating that at least some coefficients may be excluded from the CSI report. The control information may indicate that the UE should report spatial basis amplitude, frequency basis amplitude, or both. The control information may be transmitted to the UE via a higher layer such as radio resource control (RRC) and/or media access control (MAC), among various possibilities.

The wireless device (e.g., UE 106) may measure the state of the channel, e.g., according to received control information and/or configuration of the UE (804), according to some embodiments. The measurements may include any radio link measurements such as CSI, signal-noise ratio (SNR), signal to interference and noise ratio (SINR), reference signal received power (RSRP), reference signal received quality (RSRQ), received signal strength indicator (RSSI), channel quality indicator (CQI), block error rate (BLER), bit error rate (BER), etc. The measurements may be performed using any number of receive beams (e.g., of the UE 106) and/or transmit beams (e.g., of the BS 102). The measurements may be performed for any number of frequencies (e.g., SB and/or WB measurements). The measurements may be performed using reference signals (e.g., CSI-RS) transmitted by the BS 102. The measurements may be performed at any time(s), and may utilize hysteresis techniques.

Based on the channel state measurements and any control information, the UE may dynamically perform any or all of: determine spatial basis related information (806), determine frequency basis related information (808), determine common frequency basis (809), and determine spatial-frequency coefficients. Information from any of these determinations may be used to inform any of the other determinations and the determinations may be performed concurrently or in any order, e.g., as desired. For example, spatial basis related information and/or spatial-frequency coefficients may be used to determine a common frequency basis. Other temporal orders and/or logical relationships are possible. Any desired order or relationship may be configured by UE implementation or by control signaling from a base station.

The wireless device (e.g., UE 106) may determine spatial basis related information for PMI, e.g., based on the measurements of the state of the channel and configuration (806), according to some embodiments. The spatial basis information may include WB PMI parameters. The WB parameters may include WB rotation (q) (e.g., for each spatial dimension), WB indices, and WB amplitude (p) (e.g., including an indication of a strongest coefficient on each layer).

The wireless device (e.g., UE 106) may determine frequency basis related information for PMI, e.g., based on the measurements of the state of the channel and configuration (808), according to some embodiments.

The frequency basis related information may include a value or values indicating rotation (e.g., of the frequency basis), indices (e.g., to map the M or $K_0$ selected frequencies to the $N_3$ total SBs), and amplitude coefficients (p). Further, an indication of the strongest coefficient on each layer may be included.

The wireless device (e.g., UE 106) may determine a common frequency basis, e.g., based on the measurements of the state of the channel and configuration (809), according to some embodiments. The common frequency basis may include a reduced number of SBs (M) for CSI reporting, e.g., M coefficients may be reported for each beam. The value of M may be determined based on control information. However, the UE may dynamically determine/select the M basis vectors to report. In some embodiments, the UE may be configured to select and report information for a set of $K_0$ frequencies, e.g., based on control information. The set of $K_0$ frequencies may be selected based on values of the information (e.g., coefficients). For example, the $K_0$ frequencies may be selected to include the most significant (e.g., strongest) coefficients.

The wireless device (e.g., UE 106) may determine spatial-frequency coefficients for PMI, e.g., based on the measurements of the state of the channel and configuration (810), according to some embodiments. The spatial-frequency coefficients may be selected on a common frequency basis as described above. The spatial-frequency coefficients may include (e.g., for at least some of a plurality of spatial-frequency units (SFUs)), spatial-frequency phase ($\phi$) and/or spatial-frequency amplitude (p). If a spatial basis amplitude is zero, corresponding spatial-frequency phase and amplitude coefficients may not be reported (e.g., may be excluded from a CSI report). Similarly, if a frequency basis amplitude is zero, corresponding spatial-frequency phase and amplitude coefficients may not be reported (e.g., may be excluded from a CSI report). Moreover, if a spatial-frequency amplitude coefficient is zero, a corresponding phase coefficient may not be reported (e.g., may be excluded from a CSI report). Further, the UE may report the number of non-zero spatial-frequency amplitude coefficients (NZSFAC). According to various embodiments, coefficients may be reported for either M or $K_0$ SFUs; M or $K_0$ may be smaller than the number of SFUs.

The wireless device (e.g., UE 106) may encode CSI, e.g., including the PMI and/or other information (812), according to some embodiments. The CSI may be encoded into a CSI report in any number of parts, e.g., including any number of fields. According to some embodiments, the CSI may be encoded in two parts. The first part may have a fixed payload size and the second part may have a variable payload size. One or more fields of the first part may be useable to determine the payload size of the second part. The CSI report may be encoded with compression, e.g., including frequency compression.

The wireless device (e.g., UE 106) may transmit the CSI to the BS 102 (814), according to some embodiments. The CSI may be transmitted on a shared and/or control channel. The CSI report may be periodic or aperiodic. The BS 102 may receive and decode the CSI report.

The wireless device (e.g., UE 106) may exchange data with the BS 102 (816), according to some embodiments. One or both of the UE 106 and BS 102 may use precoding to exchange data, e.g., according to the CSI, among various possibilities. The exchange of data may include control information and/or application data. The control information may specify use (by the UE 106 and/or BS 102) of precoding according to the CSI report. Control information specifying configurations for future CSI reports may be included.

FIGS. 9-15—CSI Structure in NR

Figure 9:
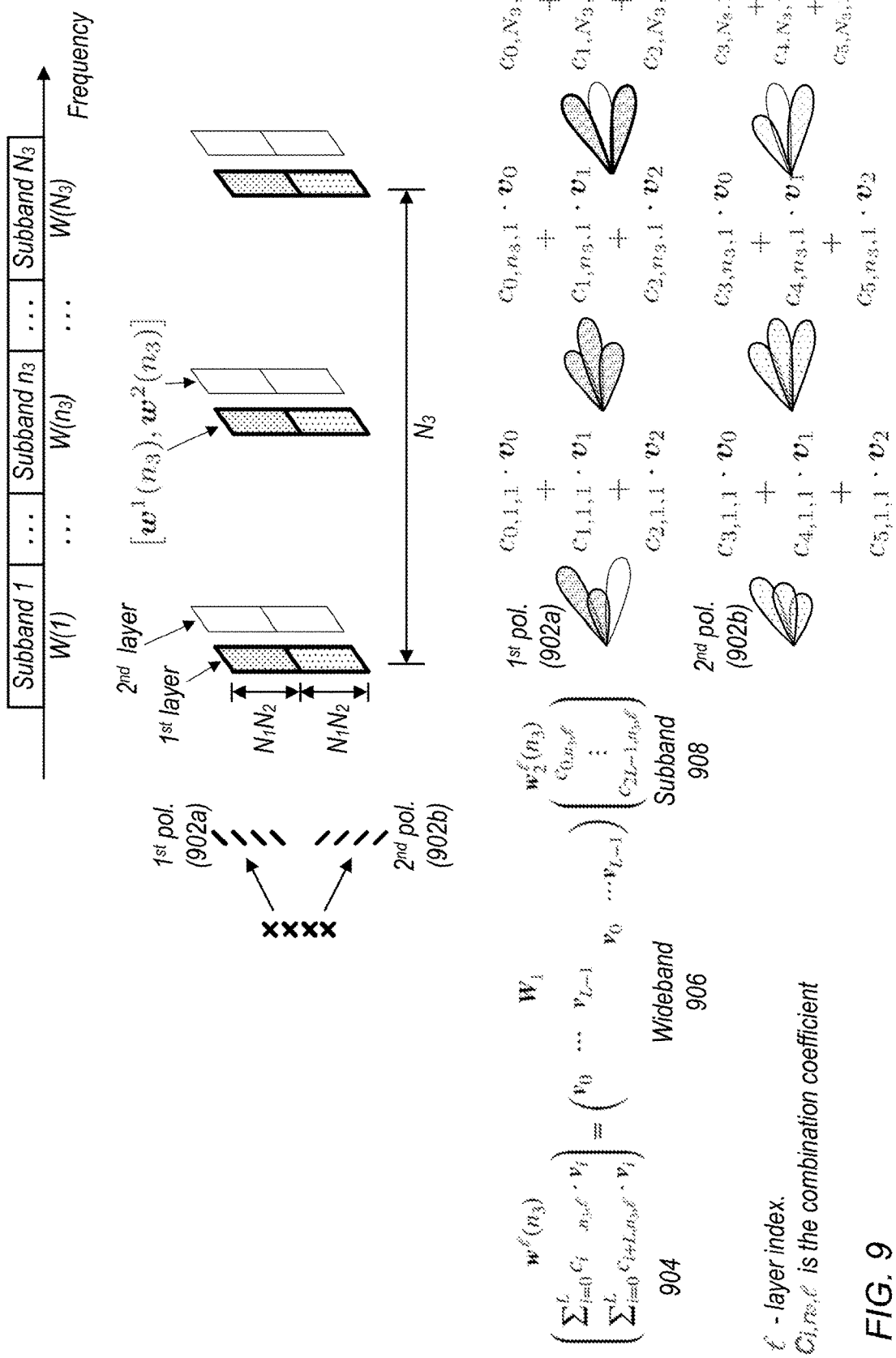
FIG. 9 illustrates WB and SB aspects of type II CSI, according to some embodiments.

FIG. 9 illustrates WB and SB aspects of type II CSI. As shown, the CSI may be encoded as the product ($w^l(n_3)$) (904) of WB DFT vectors ($v_i$, in a block diagonal matrix $W_1$, 906) and SB specific coefficients (908, e.g., $c_{i,n,l}$, where i is an index of the coefficients, n is an SB index, and l is a layer index in column $w^l_2(n_3)$). $W_1$ may be referred to as the spatial basis, e.g., beams. In the illustrated example, there are two polarizations (e.g., 902*a-b*, illustrated with different shadings) and three DFT vectors (e.g., L=3), thus for each SB, there are 6 coefficients per layer (e.g., for SB $n_3$ and layer l, $c_{0,n_3,l}$ to $c_{5,n_3,l}$). In the illustrated example, the beams that are unshaded may represent the beams with coefficients associated with the beam (e.g., $c_{i,n,l}$) equal to zero. $N_1$ and $N_2$ may refer to the number of antennas in each of two respective dimensions. The number of DFT vectors may be configured (e.g., by a BS) based on the values of $N_1$ and $N_2$ or separately from the values of $N_1$ and $N_2$. In some embodiments, the total number of antennas may range from 4 to 8, although other numbers of antennas are possible according to various embodiments.

Figure 10:
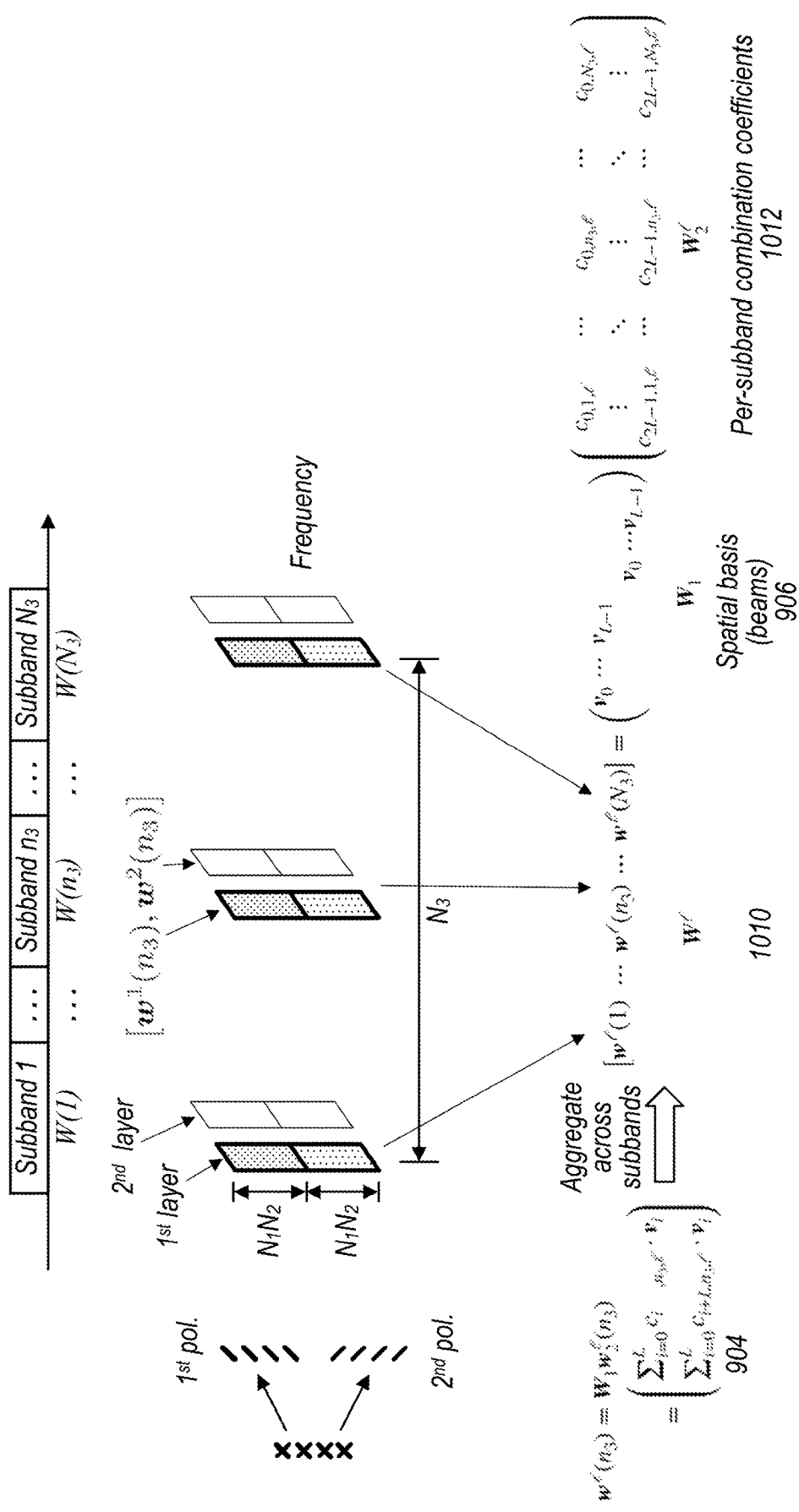
FIG. 10 illustrates the aggregation across SBs of CSI information, according to some embodiments.

FIG. 10 illustrates the aggregation across SBs of the CSI information (904) to an aggregated form (1010), according to some embodiments. As shown, the spatial basis $W_1$ (906) may remain the same, but SB coefficients $W^l_2$ (1012) may be expressed for each individual SB (e.g., $n_3$ ranging from 1 to $N_3$).

Figure 12:
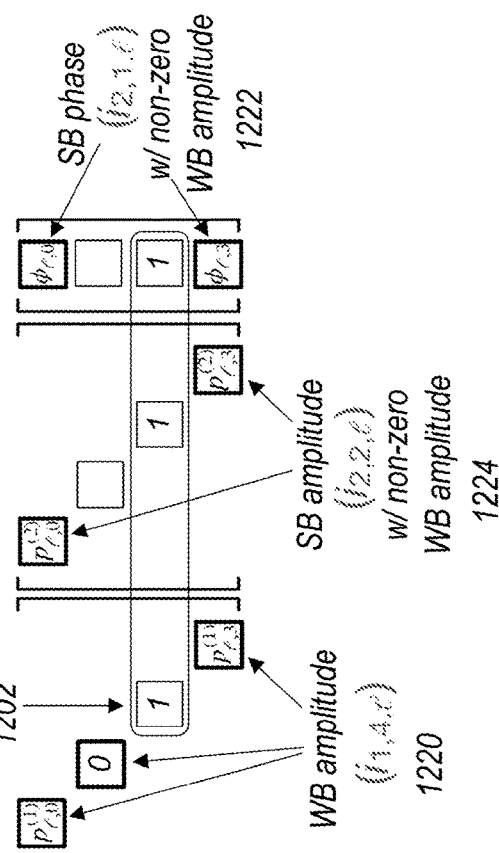
FIGS. 11 and 12 illustrate components of the CSI information, according to some embodiments.
Figure 11:
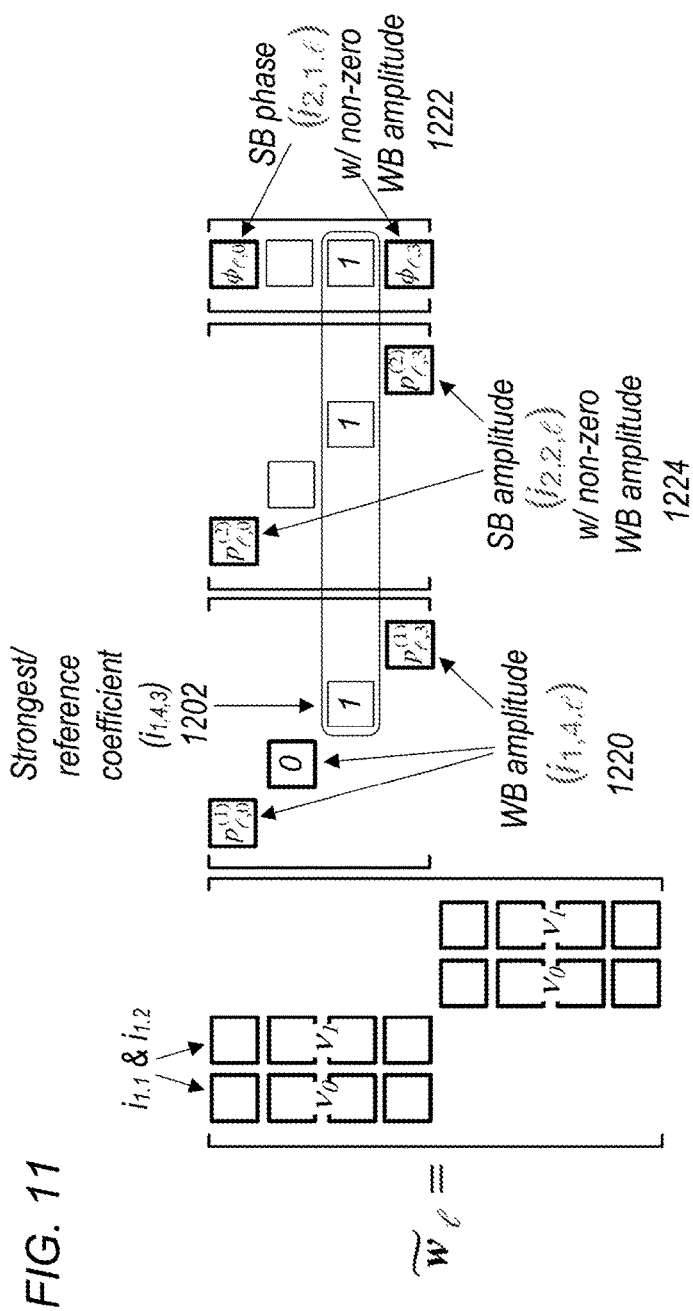

FIGS. 11 and 12 illustrate components of the CSI information, according to some embodiments. WB PMI information is indicated by $i_1$ and SB PMI components are indicated by $i_2$. The two rows of FIG. 11 may represent the two polarizations (e.g., 902*a-b*). FIG. 12 presents the same equation as FIG. 11, in an expanded form. Further, FIG. 12 presents a particular example of the coefficients to aid explanation. In the example, there are 2 layers (L=2) and 2 polarizations; therefore, there are 4 coefficients per layer.

Terms of $i_{1,1}$ may indicate the rotation for each spatial dimension. For example, $i_{1,1}=(q_1, q_2)$, where $q_k=0, 1, \ldots, O_k-1$ and k=1, 2.

Terms of $i_{1,2}$ may represent indices of the L spatial basis, e.g., $i_{1,2}=0, 1, \ldots,$ $$\binom{N_1 N_2}{L} - 1.$$

Terms of $i_{1,1}$ and $i_{1,2}$ may be combined in the DFT vectors, $v_i$.

Terms of $i_{1,4}$ may represent the WB amplitude for each layer (1220). For example, $i_{1,4}=(i_{1,4,1},i_{1,4,2},\ldots,i_{1,4,\nu})$ where $i_{1,4,l}$ indicates $(p^{(1)}_{l,0}p^{(1)}_{l,1},\ldots,p^{(1)}_{l,2L-1})$ where l=1, . . . , v. For example, the value of $i_{1,4,l}$ may be used (e.g., with a lookup table) to identify the value of $p^{(1)}_l$, e.g., the value of $i_{1,4,3}=0,1,2,\ldots,7$, may corresponds to $p^{(1)}_{l,2}=0$, sqrt(1/64), sqrt(1/32), sqrt(1/16), sqrt(1/8), sqrt(1/4), sqrt(1/2), 1. Note that these values are exemplary only and that other lookup table values are possible.

In embodiments that include compression in frequency space, only $M_l$ non-zero entries may be included in $i_{1,4,l}$). In the illustrated example, the second coefficient has zero WB amplitude. Thus, there are 3 non-zero WB amplitude coefficients ($M_l=3$). The corresponding SB coefficients (e.g., in the second row) are also zero and may not be reported, e.g., $(p^{(2)}_{l,1}=\phi_{l,1}=0)$.

Terms of $i_{1,3}$, may represent the strongest (e.g., reference) coefficient on each layer. For example, $i_{1,3}=(i_{1,3,1},i_{1,3,2},\ldots,i_{1,3,\nu})$ where $i_{1,3,l}=0, 1, \ldots, 2L-1$ and l=1, . . . , v. In FIG. 12, the strongest WB amplitude coefficient (e.g., $i_{1,3,l}=i_{1,4,3}$ may correspond to $p^{(1)}_{l,2}=2$) is highlighted in box 1202, and the corresponding SB amplitude and SB phase coefficients are also highlighted in box 1202. Note, the selected row is exemplary only—any row may contain the strongest WB amplitude coefficient. In some embodiments, the coefficients associated with the strongest WB amplitude may be normalized such that $i_{1,3}$, may be equal to 1. Thus, in the illustrated example, $p^{(1)}_{l,2}=p^{(2)}_{l,2}=\phi_{l,2}=1$ and these values may not be reported.

Turning to SB PMI, terms of $i_{2,1}$, may indicate SB phase (1220). For example, $i_{2,1}=(i_{2,1,1},\ldots,i_{2,1,\nu})$, where $i_{2,1,l}$ indicates $(\phi_{l,0}, \phi_{l,1}, \ldots, \phi_{l,2L-1})$ and l=1, . . . , v.

Terms of $i_{2,2}$, may indicate SB amplitude (e.g., if configured) (1224). For example, $i_{2,2}=(i_{2,2,1},\ldots,i_{2,2,\nu})$ where $i_{2,2,l}$ indicates $(p^{(2)}_{l,0}, p^{(2)}_{l,1}, \ldots, p^{(2)}_{l,2L-1})$ and l=1, . . . , v.

Figure 13:
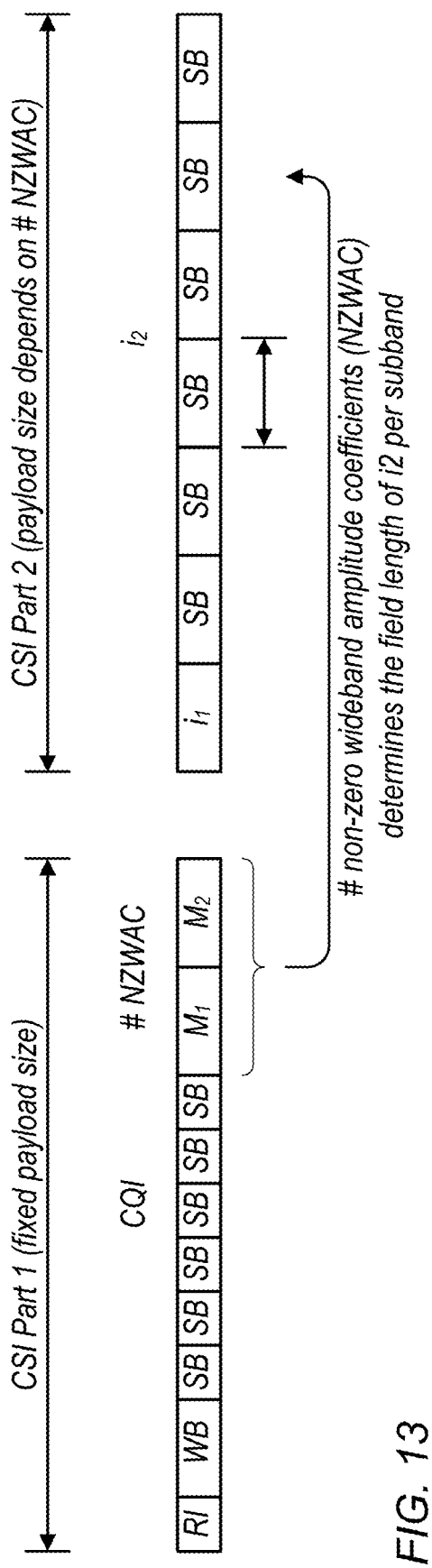
FIG. 13 illustrates a two-part CSI encoding, according to some embodiments.

FIG. 13 illustrates a two-part CSI encoding, according to some embodiments. Part 1 may have a fixed payload size (e.g., for a particular set of layers, antennas, polarizations, SBs, etc.). Part 1 may include rank indicator (RI), WB and SB CQI (e.g., a WB entry and one entry for each SB, e.g., 5 in the illustrated example), and number of non-zero wideband amplitude coefficients (NZWAC) for each polarization (e.g., $M_1$ and $M_2$). Part 2 may include the WB coefficients ($i_1$) and the SB coefficients ($i_2$). The length of the part 2 entry for each SB may be determined based on NZWAC, e.g., the payload size of part 2 may depend on NZWAC.

Figure 14:
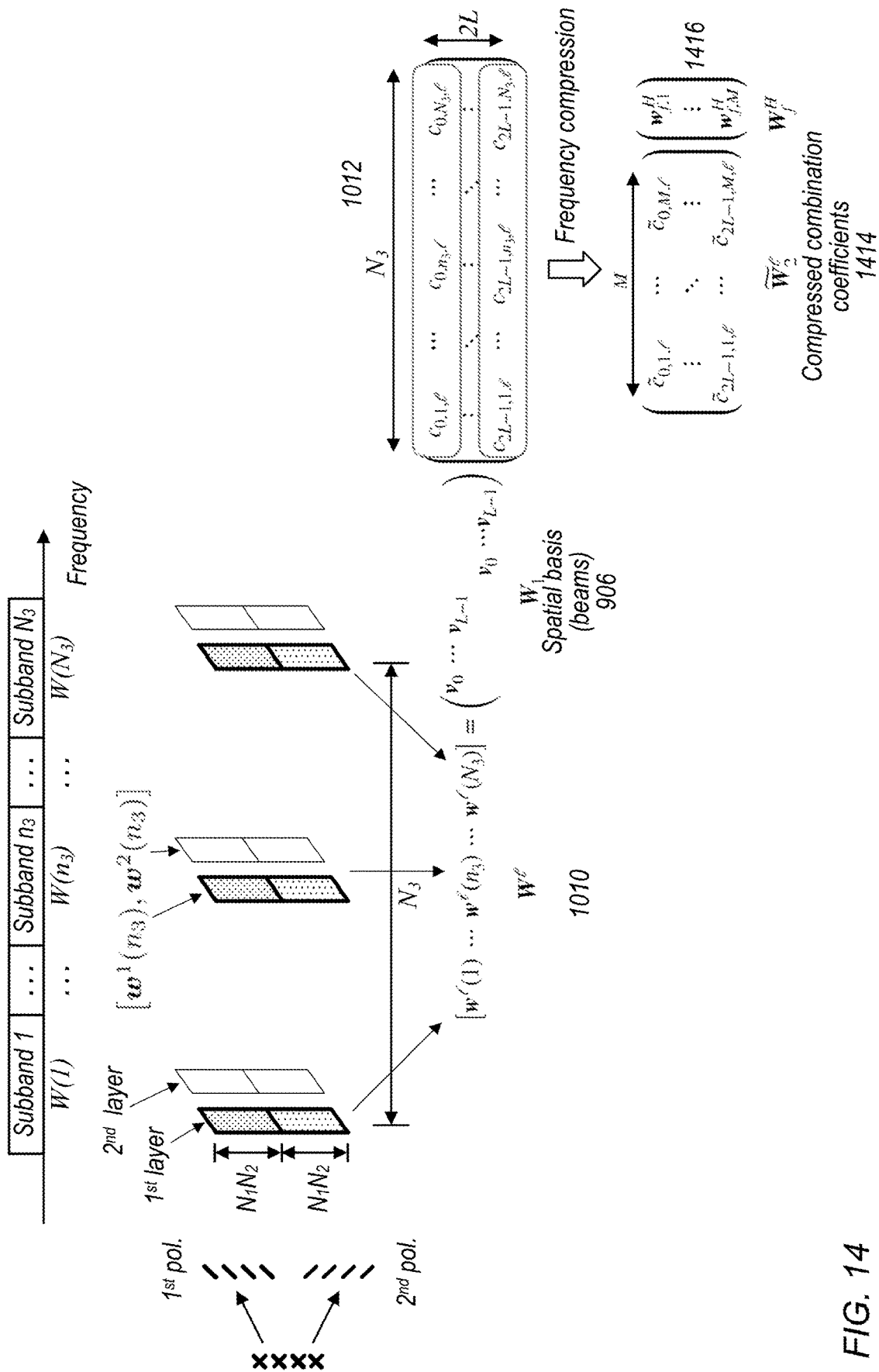
FIG. 14 illustrates frequency compression, according to some embodiments.

FIG. 14 illustrates frequency compression, according to some embodiments. As shown, there may be $N_3$*2L SB coefficients (1012). However, depending on the frequency-selectivity of the channel, neighboring SB coefficients may be similar (e.g., the elements of 1012, $\{c_{i,n3,l}\}^{N3}$ n3=1 may be correlated). Thus, overhead may be reduced by compressing $\{c_{i,n3,l}\}^{N3}$ n3=1 across the frequency dimension. To perform such compression, each coefficient may be represented in an M basis, where M<$N_3$. Such compression may result in a matrix (1414) of compressed coefficients and a vector (1416) to map the compressed coefficients to frequencies (SBs). This vector may be referred to as the frequency basis, e.g., a subset of DFT vectors. The dimension (M) may be a number of SBs (e.g., in NR rel. 15, indicated by csiReportingBand, and ranging from 1-19). Note that different layers and polarizations may have different numbers of coefficients after compression.

Figure 15:
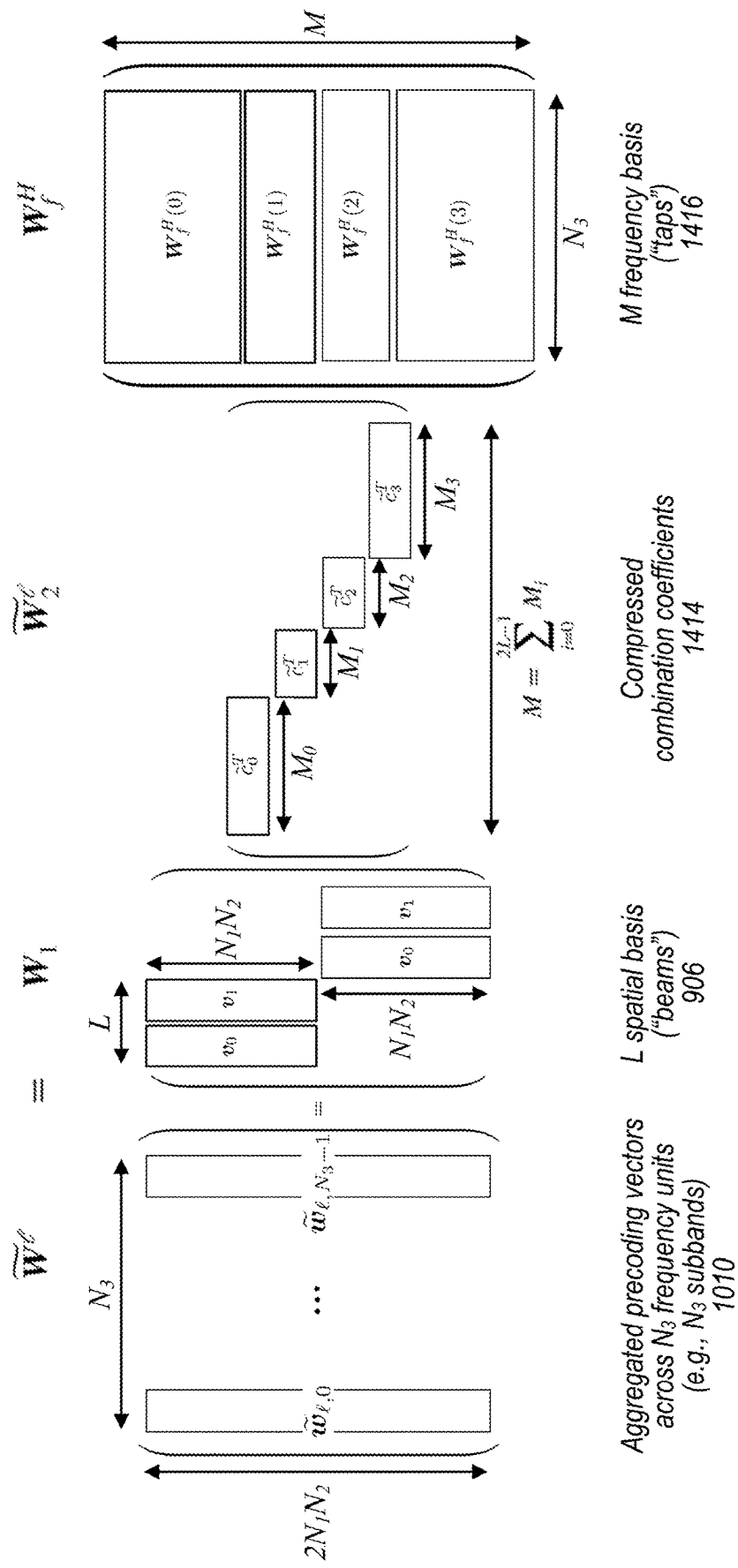
FIG. 15 illustrates a general structure of an aggregated precoding vector, according to some embodiments.

FIG. 15 illustrates a general structure of an aggregated precoding vector, according to some embodiments. The aggregate precoding vectors (1010) are the product of the spatial basis (906), the compressed coefficients (1414), and the vector of compressed SBs (e.g., "taps") (1416). Again, the upper elements of 906, 1414 (e.g., $M_0$, $M_1$), and 1416 (e.g., $W_f^h(0)$, $W_f^h(1)$) may be associated with the first polarization 902a and the lower elements of 906, 1414, and 1416 may be associated with the second polarization 902b.

FIGS. 16-17—Common Frequency Basis Selection

FIGS. 16 and 17 illustrate a common frequency basis selection for encoding PMI, e.g., in type II CSI, according to some embodiments. The common frequency basis selection may offer reduced overhead relative to existing techniques.

As illustrated in FIG. 16, The common frequency basis selection may include the following assumptions: 1) The same (e.g., common) coefficients may be selected and reported for each of the 2L beams, e.g., M coefficients may be reported for each beam (M may be smaller than the number of SBs); 2) The matrix (compressed form of $W_2$) of compressed combination coefficients may be composed of K=2LM linear combination coefficients; and 3) The value of M is higher-layer configured and the M basis vectors are dynamically selected (reported). For example, frequency compression may be enabled, with the BS selecting the level of compression (e.g., number of coefficients to report) and the UE selecting which specific coefficients to report. The BS may make such a selection of the level of compression based on measurements of the frequency selectivity of the channel. The UE may select the specific coefficients that are least correlated.

The PMI may include the following components: 1) the spatial basis related information (e.g., the same or similar to $i_1$, e.g., as described above with respect to FIGS. 8, 11 and 12 and as implemented in Rel.-15) (906, 1220), 2) the spatial-frequency coefficients ($i_2$) (1630), and 3) the frequency basis related information ($i_3$) (1616, 1632).

The spatial-frequency coefficients ($i_2$) (1630) may include $i_{2,1}$, indicating spatial-frequency phase where $i_{2,1}$=($i_{2,1,1}$, . . . , $i_{2,1,v}$) and $i_{2,1,l}$ indicates $(\phi_{i,m,l})_{2L\times M}$ and l=1, . . . , v.

The spatial-frequency coefficients ($i_2$) (1630) may include $i_{2,2}$, indicating spatial-frequency amplitude where $i_{2,2}$=($i_{2,2,1}$, . . . , $i_{2,2,v}$) and $i_{2,2,l}$ indicates $(p^{(2)}_{i,m,l})_{2L\times M}$ and l=1, . . . , v. In some embodiments, the spatial-frequency amplitude coefficients may not be included, e.g., according to some configurations.

The frequency basis related information ($i_3$) may include $i_{3,1}$, rotation of the frequency basis, where $i_{3,1}$=0, 1, . . . , $O_3$−1. The frequency basis may be a subset of oversampled DFT vectors. For example, (e.g., when the oversampling rate is $O_3$) there may be $O_3$ subsets. Thus, $i_{3,1}$ may indicate which subset of the $O_3$ subsets of DFT vectors is used for CSI reporting.

The frequency basis related information ($i_3$) may include $i_{3,2}$, indices of the M frequency basis (1616) where $i_{3,2}$= 0, 1, . . . , $$\binom{N_3''}{M} - 1,$$

where $N_3''$ may be the length of the DFT vectors. In other words, in each of the $O_3$ subsets, there may be $N_3''$ orthogonal DFT vectors. Thus, $i_{3,2}$, indicates a choice of M out of $N_3''$.

The frequency basis related information ($i_3$) may include $i_{3,4}$(1632), the amplitude for each layer. For example, $i_{3,4}$=$i_{3,4,2}$, . . . , $i_{3,4,v}$) where $i_{3,4,l}$ indicates $(p^{(3)}_{1,6} p^{(3)}_{2,l}, \ldots, p^{(3)}_{M,l})$ and l=1, . . . , v.

The frequency basis related information ($i_3$) may include $i_{3,3}$, the strongest (e.g., amplitude) coefficient on each layer. For example, $i_{3,3}$=($i_{3,3,1}$, $i_{3,3,2}$, . . . , $i_{3,3,v}$) where $i_{3,3,l}$=0, 1, . . . , M−1 and l=1, . . . , v. In other words, the UE may report the position (e.g., index, e.g., in the sequence of reported coefficients), which position has the largest coefficient. The value of reported coefficients may be normalized so that coefficients in this position may be equal to 1. Thus, the value of coefficients in this position and may not be reported.

According to various embodiments, a UE may be configured to report either or both of spatial basis amplitude ($i_{1,4}$) and/or the frequency basis amplitude ($i_{3,4}$). For example, in the case of a relatively small number of antennas (e.g., a wide beam), the spatial variation may be small. Therefore, in such a case, it may be efficient to only report the frequency basis amplitude. Conversely, in the case of narrow beams and small numbers of SBs, it may be efficient to only report spatial basis amplitude ($i_{1,4}$). The BS may configure the UE to report the desired parameters or the UE may be configured to select which parameters to report (e.g., based on rules, for example based on comparing the numbers of antennas and/or SBs to one or more thresholds).

In some embodiments, if a spatial basis amplitude is zero, the corresponding spatial-frequency coefficients may not be reported (e.g., if $p^{(1)}_{i,l}$=0, then $p^{(2)}_{i,m,l}$ and $\phi_{i,m,l}$ may not be reported for all m).

In some embodiments, if a frequency basis amplitude ($i_{3,4}$) is zero, the corresponding spatial-frequency coefficients may not be reported (e.g., if $p^{(3)}_{m,l}$=0, then $p^{(2)}_{i,m,l}$ and $\phi_{i,m,l}$ may not be reported for all l).

In some embodiments, a UE may be configured to report the number of non-zero spatial-frequency amplitude coefficients (NZSFAC). Further, if $p^{(2)}_{i,m,l}$ is zero, then $\phi_{i,m,l}$ may not be reported.

FIG. 17 illustrates the information describe above with respect to FIG. 16 encoded as a two part CSI report, according to some embodiments. Similar to FIG. 13, discussed above, part 1 may have a fixed payload size and may include RI and CQI (both WB and for each SB). Further, part 1 may include indicators of the number of NZSFAC for each layer (labeled $SF_1$ and $SF_2$). The number of NZSFAC may indicate the length of the payload in part 2 (specifically, $i_2$) for each spatial-frequency unit (SFU). Part 2 may include the $i_1$ information (e.g., DFT vectors 906 and WB amplitudes 1220), the $i_3$ information (e.g., frequency basis indices 1616), and $i_2$ information for each SFU.

Figure 19:
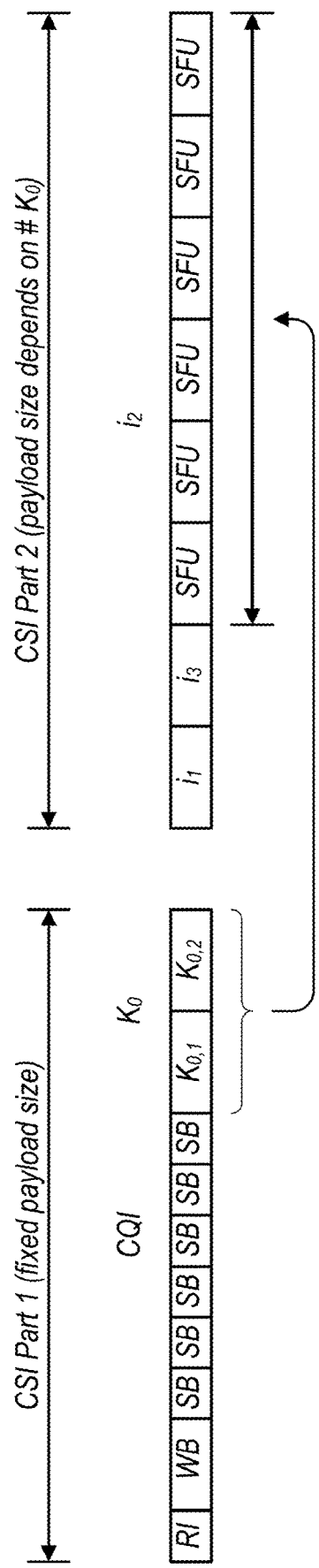

FIGS. 18-19—$K_0$ Common Frequency Selection

FIGS. 18 and 19 illustrate a variation on the common frequency selection described above, e.g., with respect to FIGS. 8, 16, and 17.

As illustrated in FIG. 18, the common frequency basis selection may include the following assumptions: 1) The same (e.g., common) coefficients may be selected and reported for each of the 2L beams, e.g., M coefficients may be reported for each beam; 2) the matrix (compressed form of $W_2$) of compressed combination coefficients may be composed of $K_0<K=2LM$ linear combination coefficients; and 3) The value of M is higher-layer configured and the M basis vectors are dynamically selected (reported). For example, selection of a set of the most useful (e.g., strongest) $K_0$ coefficients may be enabled, with the BS selecting the level of selection (e.g., number of coefficients to report) and the UE selecting which specific coefficients to report. Alternatively, the UE may determine the level of selection autonomously (e.g., based on configured rules). The BS (and/or UE) may make such a determination of the level of selection based on various measurements (e.g., of the channel, activity of the UE, load levels, etc.) The UE may select the $K_0$ specific coefficients that are most significant.

The PMI may include the following components: 1) the spatial basis related information (e.g., the same or similar to $i_1$, e.g., as described above with respect to FIGS. 8, 11, 12, and 16 and as implemented in Rel.-15) (906), 2) spatial-frequency coefficients ($i_2$) (1830) (note, $K_0$ coefficients may be included), and 3) frequency basis related information ($i_3$) related to the $K_0$ coefficients (1816). Note that some of the terms in FIG. 16 may not be included in FIG. 18, e.g., because of the further selection of $K_0$ specific coefficients.

The spatial-frequency coefficients ($i_2$) (1830) may include $i_{2,1}$, indicating spatial-frequency phase where $i_{2,1}$= ($i_{2,1,1}$, . . . , $i_{2,1,v}$) and $i_{2,1,l}$ indicates $(\phi_{i,m,l})_{2L \times M}$ and $l=1, \ldots, v$.

The spatial-frequency coefficients ($i_2$) (1830) may include $i_{2,2}$, indicating spatial-frequency amplitude where $i_{2,2}$= ($i_{2,2,1}$, . . . , $i_{2,2,v}$) and $i_{2,2,l}$ indicates $(p^{(2)}_{i,m,l})_{2L \times M}$ and $l=1, \ldots, v$. In some embodiments, the spatial-frequency amplitude coefficients may not be included, e.g., according to some configurations.

The frequency basis related information ($i_3$) may include $i_{3,1}$, rotation of the frequency basis, where $i_{3,1}$=0, 1, . . . , $O_3-1$. The frequency basis may be a subset of oversampled DFT vectors. For example, (e.g., when the oversampling rate is $O_3$) there may be $O_3$ subsets. Thus, $i_{3,1}$ may indicate which subset of the $O_3$ subsets of DFT vectors is used for CSI reporting.

The frequency basis related information ($i_3$) may include $i_{3,2}$, indices of the M frequency basis (1816) where $i_{3,2}$= 0, 1, . . . , $$\binom{N_3''}{M} - 1,$$

where $N_3''$ may be the length of the DFT vectors. In other words, in each of the $O_3$ subsets, there may be $N_3''$ orthogonal DFT vectors. Thus, $i_{3,2}$, indicates a choice of M out of $N_3''$.

In some embodiments, if a spatial-frequency amplitude is zero, the corresponding spatial-frequency phase may not be reported. For example, if $p^{(2)}_{i,m,l}$ is zero, then $\phi_{i,m,l}$ may not be reported.

In some embodiments, a number (e.g., $K_0$)NZSFAC may be indicated by a field with a length of $\log_2(2LM/K_0)$ bits. Such a field may be layer specific, e.g., different $K_0$ may be selected for each layer (e.g., and/or polarization). Such a field may indicate the positions (indices) of the set of $K_0$ coefficients.

FIG. 19 illustrates the information described above with respect to FIG. 18 encoded as a two part CSI report, according to some embodiments. Similar to FIGS. 13 and 16, discussed above, part 1 may have a fixed payload size and may include RI and CQI (both WB and for each SB). Further, part 1 may include indicators of the positions of the $K_0$ selected NZSFAC for each layer (labeled $K_{0,1}$ and $K_{0,2}$). The level of selection (e.g., value of $K_0$) may indicate the length of the payload in part 2 (specifically, $i_2$). For example, the value of $K_0$ may determine the number of SFU coefficients included in part 2. Part 2 may include the $i_1$ information (e.g., DFT vectors 906 and spatial basis amplitudes). The spatial basis amplitudes may be similar to WB amplitudes 1220, e.g., $i_{1,4}$ may indicate spatial basis amplitude when frequency compression is employed. Part 2 may further include the $i_3$ information (e.g., frequency basis indices 1816), and $i_2$ information for each of the $K_0$ SFUs.

Further Information and Examples

In the following, exemplary embodiments are provided.

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Yet another exemplary set of embodiments may include a 5G NR network node or base station configured to perform any action or combination of actions as substantially described herein in the Detailed Description and/or Figures.

Yet another exemplary set of embodiments may include a 5G NR network node or base station that includes any component or combination of components as described herein in the Detailed Description and/or Figures as included in a mobile device.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
a processor configured to cause a user equipment (UE) to:
establish a connection with a base station;
receive, from the base station, control information for reporting channel state information in a channel state information report;
determine a spatial basis, W1, for L vectors;
determine M basis vectors after compression from $N_3$ frequency units in frequency domain;
determine a plurality of compressed combination coefficients of a matrix of size 2LM coefficients associated with the determined spatial basis and M basis vectors, wherein the plurality of compressed combination coefficients corresponds to a particular layer;
encode the channel state information report including:
a first part including rank indicator information, wideband channel quality indicator (CQI) information, sub-band CQI information, and one or more fields indicating a number of non-zero coefficients to be reported; and
a second part including a field indicating indices of non-zero coefficients to be reported within the plurality of compressed combination coefficients; and
transmit the encoded channel state information report to the base station.

2. The apparatus of claim 1, wherein the indices of the non-zero coefficients correspond to a selected subset of a set of non-zero coefficients.

3. The apparatus of claim 2, wherein the selected subset of the set of non-zero coefficients are the most significant spatial-frequency coefficients within the plurality of coefficients.

4. The apparatus of claim 1, wherein the field indicating the indices of the non-zero coefficients is layer specific in that a number of non-zero coefficients per layer is indicated per layer, wherein the number is layer specific.

5. The apparatus of claim 4, wherein a total number of non-zero coefficients per layer is indicated in the encoded channel state information report.

6. The apparatus of claim 1, wherein a value of $N_3$ is based on a number of subbands associated with the channel state information report, and wherein the M basis vectors are common to the number of subbands.

7. The apparatus of claim 1, wherein the encoded channel state information report includes an indication of a position of the strongest amplitude coefficient on each layer.

8. The apparatus of claim 1, wherein the first part includes a second one or more fields indicating a total number of coefficients per layer.

9. A user equipment (UE) comprising:
a radio; and
a processor operably coupled to the radio and configured to cause the UE to:
establish a connection with a base station;
receive, from the base station, control information for reporting channel state information in a channel state information report;
determine a spatial basis, W1, for L vectors;
determine M basis vectors after compression from $N_3$ frequency units in frequency domain;
determine a plurality of compressed combination coefficients of a matrix of size 2LM coefficients associated with the determined spatial basis and M basis vectors, wherein the plurality of compressed combination coefficients corresponds to a particular layer;
encode the channel state information report including:
a first part including rank indicator information, wideband channel quality indicator (CQI) information, sub-band CQI information, and one or more fields indicating a number of non-zero coefficients to be reported; and
a second part including a field indicating indices of non-zero coefficients to be reported within the plurality of compressed combination coefficients; and
transmit the encoded channel state information report to the base station.

10. The UE of claim 9, wherein the indices of the non-zero coefficients correspond to a selected subset of a set of non-zero coefficients.

11. The UE of claim 10, wherein the selected subset of the set of non-zero coefficients are the most significant spatial-frequency coefficients within the plurality of coefficients.

12. The UE of claim 9, wherein the field indicating the indices of the non-zero coefficients is layer specific in that a number of non-zero coefficients per layer is indicated per layer, wherein the number is layer specific.

13. The UE of claim 12, wherein a total number of non-zero coefficients per layer is indicated in the encoded channel state information report.

14. The UE of claim 9, wherein a value of $N_3$ is based on a number of subbands associated with the channel state information report, and wherein the M basis vectors are common to the number of subbands.

15. A method, comprising:
at a base station:
establishing a connection with a user equipment (UE);
transmitting, to the UE, control information for reporting channel state information in a channel state information report; and
receiving, from the UE, an encoded channel state information report according to the control information, wherein the encoded channel state information report includes:
a first part including rank indicator information, wideband channel quality indicator (CQI) information, sub-band CQI information, and one or more fields indicating a number of non-zero coefficients to be reported; and
a second part including a field indicating indices of non-zero coefficients to be reported within a plurality of compressed combination coefficients.

16. The method of claim 15, wherein the field indicating the indices of the non-zero coefficients is layer specific in that a number of non-zero coefficients per layer is indicated per layer, wherein the number is layer specific.

17. The method of claim 16, wherein a total number of non-zero coefficients per layer is indicated in the encoded channel state information report.

18. The method of claim 15, wherein the encoded channel state information report includes an indication of a position of the strongest amplitude coefficient on each layer.

19. The method of claim 15, wherein the first part includes a second one or more fields indicating a total number of coefficients per layer.

20. The method of claim 15, wherein the indices of the non-zero coefficients correspond to a selected subset of a set of non-zero coefficients.

* * * * *